United States Patent
Kishore et al.

(10) Patent No.: US 8,151,360 B1
(45) Date of Patent: Apr. 3, 2012

(54) SYSTEM AND METHOD FOR ADMINISTERING SECURITY IN A LOGICAL NAMESPACE OF A STORAGE SYSTEM ENVIRONMENT

(75) Inventors: K. Uday Kishore, Bangalore (IN); Shankar Balasubramanian, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 1326 days.

(21) Appl. No.: 11/384,795

(22) Filed: Mar. 20, 2006

(51) Int. Cl.
G06F 17/30 (2006.01)
G06F 21/00 (2006.01)
G06F 15/16 (2006.01)

(52) U.S. Cl. ............ 726/28; 726/2; 726/4; 726/10; 713/182; 713/183; 713/184; 713/185; 713/186; 709/202; 709/219; 709/225; 709/229

(58) Field of Classification Search ............ 726/1–21, 726/26–33; 713/182–186; 709/217–219, 709/227–229, 202; 707/1–10
See application file for complete search history.

(56) References Cited

U.S. PATENT DOCUMENTS

| | | | |
|---|---|---|---|
| 5,689,701 A | 11/1997 | Ault et al. | |
| 5,742,806 A | 4/1998 | Reiner et al. | |
| 6,061,743 A | 5/2000 | Thatcher et al. | |
| 6,438,600 B1 | 8/2002 | Greenfield et al. | |
| 6,567,808 B1 | 5/2003 | Eschelbeck et al. | |
| 6,574,655 B1 * | 6/2003 | Libert et al. | 709/200 |
| 6,714,968 B1 * | 3/2004 | Prust | 709/219 |
| 6,721,777 B1 | 4/2004 | Sharma | |
| 6,742,039 B1 * | 5/2004 | Remer et al. | 709/229 |
| 6,834,284 B2 | 12/2004 | Acker et al. | |
| 6,947,925 B2 | 9/2005 | Newcombe et al. | |
| 7,010,600 B1 * | 3/2006 | Prasad et al. | 709/225 |
| 7,082,600 B1 | 7/2006 | Rau et al. | |
| 7,082,604 B2 | 7/2006 | Schneiderman | |
| 7,210,125 B2 | 4/2007 | Chang et al. | |
| 7,210,131 B2 | 4/2007 | Schmidt et al. | |
| 7,296,041 B2 | 11/2007 | Nakatani et al. | |
| 7,313,560 B2 | 12/2007 | Dilley et al. | |
| 7,337,197 B2 | 2/2008 | Wilson et al. | |
| 7,346,664 B2 | 3/2008 | Wong et al. | |
| 7,370,029 B2 | 5/2008 | Ito et al. | |
| 7,437,407 B2 * | 10/2008 | Vahalia et al. | 709/203 |
| 7,475,151 B2 | 1/2009 | Delany et al. | |
| 7,640,247 B2 | 12/2009 | Pudipeddi | |

(Continued)

OTHER PUBLICATIONS

Balasubramanian et al., System and Method for Data Migration Management in a Logical Namespace of a Storage System Environment, U.S. Appl. No. 11/384,776, filed Mar. 20, 2006, 37 pages.

(Continued)

Primary Examiner — Taghi Arani
Assistant Examiner — Thaddeus Plecha
(74) Attorney, Agent, or Firm — Cesari and McKenna, LLP

(57) ABSTRACT

A system and method administers security in a logical namespace of a storage system environment. A remote agent performs an integral security-related role within a management framework that is directed to off-loading administration of privileges from a namespace and storage management (NSM) server for namespace and storage management. NSM server rights are defined and assigned to a user of the NSM server in accordance with a security administration feature of the management framework. In addition, a multi-stage authentication procedure is provided to ensure that a user has the appropriate rights to perform operations on the NSM server.

16 Claims, 5 Drawing Sheets

U.S. PATENT DOCUMENTS

| | | | |
|---|---|---|---|
| 7,664,818 | B2 | 2/2010 | Wolber et al. |
| 7,689,989 | B2 | 3/2010 | Dostert et al. |
| 7,702,563 | B2 | 4/2010 | Balson et al. |
| 7,814,050 | B2 | 10/2010 | Mehta et al. |
| 2002/0010783 | A1 | 1/2002 | Primak et al. |
| 2002/0116454 | A1 | 8/2002 | Dyla et al. |
| 2002/0116485 | A1* | 8/2002 | Black et al. .................. 709/223 |
| 2002/0191619 | A1* | 12/2002 | Shafer .......................... 370/401 |
| 2003/0074393 | A1* | 4/2003 | Peart ............................ 709/203 |
| 2004/0122917 | A1 | 6/2004 | Menon et al. |
| 2004/0249902 | A1* | 12/2004 | Tadayon et al. .............. 709/207 |
| 2005/0044423 | A1 | 2/2005 | Mellmer et al. |
| 2005/0125503 | A1 | 6/2005 | Iyengar et al. |
| 2005/0210033 | A1 | 9/2005 | Newcombe et al. |
| 2005/0226059 | A1* | 10/2005 | Kavuri et al. ............ 365/189.05 |
| 2006/0036570 | A1 | 2/2006 | Schaefer et al. |
| 2006/0080352 | A1* | 4/2006 | Boubez et al. ............... 707/102 |
| 2006/0122955 | A1 | 6/2006 | Bethlehem et al. |
| 2006/0123062 | A1 | 6/2006 | Bobbitt et al. |
| 2007/0038697 | A1 | 2/2007 | Zimran et al. |
| 2007/0055703 | A1 | 3/2007 | Zimran et al. |
| 2007/0088702 | A1* | 4/2007 | Fridella et al. .................. 707/10 |
| 2008/0114854 | A1* | 5/2008 | Wong et al. ................... 709/214 |
| 2008/0172423 | A1* | 7/2008 | Shinkai et al. ................ 707/203 |

OTHER PUBLICATIONS

DCE 1.2.2 DFS Administration Guide and Reference, 1997, published by The Open Group, 1997, 1187 pages.

DataFabric® Manager 3.2 Administration Guide, 1994-2004, published by Network Appliance, Inc., Sep. 2005, 564 pages.

Kishore et al., System and Method for Integrating Namespace Management and Storage Management in a Storage System Environment, U.S. Appl. No. 11/384,711, filed Mar. 20, 2006, 41 pages.

VFM™ (Virtual File Manager) Reference Guide, Version 3.0, 2001-2003, 197 pages.

VFM™ (Virtual File Manager) Getting Started Guide, Version 3.0, 2001-2003, 62 pages.

Balasubramanian et al., Migration Engine for Use in a Logical Namespace of a Storage System Environment, U.S. Appl. No. 11/384,804, filed Mar. 20, 2006, 38 pages.

Moons, Herman et al., *Location-Independent Object Invocation in Open Distributed Systems*, Autumn 1991 EurOpen Technical Conference and Exhibition, pp. 287-300 (Sep. 16-20, 1991).

Pitt et al., Java.rmi The Remote Method Invocation uide, Jul. 18, 2001, Addison Wesley, Chapters 6 & 13.

Fischer, JNDI Unleashed, May 29, 2000, Quantum Enterprise Solutions, Inc.

Sun Microsystems, RMI Registry Service Provider for the Java Naming and Directory Interface (JNDI), 2001, Sun Microsystems.

Farley et al., Java Enterprise in a Nutshell, 3$^{rd}$ Edition, Nov. 22, 2005.

Sun Microsystems, JNDI Service Providers, Jun. 4, 2004, Sun Microsystems.

Perrone et al., Java Naming and Directory Service Interfaces, Oct. 1999, Assured Technologies, Inc.

Sun Microsystems, The JNDI Tutorial, 2003, Sun Microsystems.

Sun Microsystems, JNDI Naming & Directory Interface, May 2005, Sun Microsystems.

Grosso, Java RMI, Oct. 29, 2001, Oreilly, Chapter 15.

Arnold et al., The Java Programming Language Second Edition, 1998, Addison Wesley, Chapter 1, 2, 9, 10, 15, 17.

U.S. Appl. No. 11/414,593 entitled Namespace and Storage Management Application Infrastructure for Use in Management of Resources in a Storage System Enviroment, filed Apr. 28, 2006 by Stevem Klinkner.

\* cited by examiner

SYSTEM AND METHOD FOR ADMINISTERING SECURITY IN A LOGICAL NAMESPACE OF A STORAGE SYSTEM ENVIRONMENT

CROSS-REFERENCE TO RELATED APPLICATION

The present invention is related to the following commonly assigned U.S. patent application Ser. No. 11/384,711 titled, System and Method for Integrating Namespace Management and Storage Management in a Storage System Environment, filed herewith, which application is hereby incorporated by reference.

FIELD OF THE INVENTION

The present invention relates to storage systems, and more specifically, to a logical namespace service configured to administer security in a storage system environment.

BACKGROUND OF THE INVENTION

A storage system typically comprises one or more storage devices into which information may be entered, and from which information may be obtained, as desired. The storage system includes an operating system that functionally organizes the system by, inter alia, invoking storage operations in support of a storage service implemented by the system. The storage system generally provides its storage services through the execution of software modules, such as processes. The storage system may be implemented in accordance with a variety of storage architectures including, but not limited to, a network-attached storage environment, a storage area network and a disk assembly directly attacked to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access information stored on the system. In this model, the storage system may be embodied as file server executing an operating system, such as the Microsoft® Windows™ operating system (hereinafter "Windows operating system"). Furthermore, the client may comprise an application executing on an operating system of a computer that "connects" to the server over a computer network, such as a point-to-point link, shared local area network, wide area network, or virtual private network implemented over a public network, such as the Internet. Each client may request the services of the server by issuing storage access protocol messages (in the form of packets) to the server over the network. By supporting a plurality of storage (e.g., file-based) access protocols, such as the conventional Common Internet File System (CIFS) and the Network File System (NFS) protocols, the utility of the server is enhanced.

To facilitate client access to the information stored on the server, the Windows operating system typically exports units of storage, e.g., (CIFS) shares. As used herein, a share is equivalent to a mount point or shared storage resource, such as a folder or directory that stores information about files or other directories served by the file server. A Windows client may access information in the directory by mounting the share and issuing a CIFS protocol access request that specifies a uniform naming convention (UNC) path to the share. The UNC path or pathname is an aspect of a Windows networking environment that defines a way for a client to refer to a unit of storage on a server. The UNC pathname is prefixed with the string \\ to indicate resource names on a network. For example, a UNC pathname may comprise a server name, a share (directory) name and a path descriptor that collectively reference a unit of storage or share. Thus, in order to access the share, the client typically requires knowledge of the specific physical location (i.e., the identity) of the server exporting the share.

Instead of requiring the client to provide the specific identity of the file server exporting the share, it is desirable to only require a logical pathname to the share. That is, it is desirable to provide the client with a globally unique pathname to the share without reference to the file server. The conventional Distributed File System (DFS) namespace service provides such a solution in a Windows environment through the creation of a namespace that removes the specificity of server identity. DFS is well-known and described in DCE 1.2.2 *DFS Administration Guide and Reference,* 1997, which is hereby incorporated by reference. As used herein, a namespace is a view of shared storage resources (such as shares) from the perspective of a client. The DFS namespace service is generally implemented using one or more DFS servers and distributed components in a network.

Using the DFS service, it is possible to create a unique pathname (in the form of a UNC pathname) for a storage resource that a DFS server translates to an actual location of the resource (share) in the network. However, in addition to the DFS namespace provided by the Windows operating system, there are many other namespace services provided by various operating system platforms, including the NFS namespace provided by the conventional Unix® operating system. Each service constructs a namespace to facilitate management of information using a layer of indirection between a file server and client accessing a shared storage resource (share) on the server. For example, a share may be connected or "linked" to a link point (link in DFS terminology or a mount point in NFS terminology) to hide the machine specific reference to the share. By referencing the link point, the client can automatically access information on the storage resource of the specific machine. This allows an administrator to store the information on any server in the network by merely providing a reference to the information (or share). However, these namespaces are typically services created on heterogeneous server platforms, which leads to incompatibility and non-interoperability with respect to management of the namespaces by the user. For example, the DFS namespace service is generally limited to Windows-based operating system platforms, whereas the NFS namespace service is generally limited to Unix-based operating system platforms.

The Virtual File Manager (VFM™) developed by NuView, Inc. and available from Network Appliance, Inc., ("NetApp") provides a namespace service that supports various protocols operating on various file server platforms, such as NetApp filers and DFS servers. The VFM namespace service is well-known and described in *VFM™ (Virtual File Manager) Reference Guide, Version* 4.0, 2001-2003, and *VFM™ (Virtual File Manager) Getting Started Guide, Version* 4.0, 2001-2003.

A storage system environment may be organized as a group of machines, such as general purpose computers and specialized servers, on a network that is administered as a unit or "domain" with common rules and procedures. A domain controller manages access to a set of network resources by users of the machines in the domain. To that end, the domain controller also provides security (e.g., rights, privileges and authentication) services for the users in the domain, such that a user need only log into the domain to gain access to the resources, which may be located on one or more machines in the network. An example of such a storage system environment is a Windows environment, wherein the domain controller is typically embodied as a primary domain controller (PDC) server. The PDC server provides the security service through management of a master user database for the domain.

The concept of a domain not only allows a user to access resources on different is machines in, e.g., a first domain, but also allows the user to access network resources in a second domain in accordance with a trust relationship. A trust relationship is thus an arrangement between the two domains, such as Windows domains, that allows the first domain to recognize all users of the second domain. In this arrangement, the user need only log into the first domain to obtain access to the resources in the second domain. Upon establishing the trust relationship, users (i.e., user accounts) are granted privileges (i.e., rights to perform certain operations) in domains other than the one in which they were created. As used herein, a privilege denotes the right of user to perform certain operations, such as the right to access a share as mandated by the user's account.

Typically, a namespace server must establish a pre-configured (i.e., static) trust relationship with each host machine in a domain to enable management of a particular namespace. That is, the server typically requires a tightly-coupled arrangement and corresponding direct communication with the operating system of each host machine in order to establish the trust relationship. As a result, the namespace server must have sufficient privileges to each host machine with which it operates and, thus, must centrally administer the privileges for all machines in the domain. Such centralized administration of privileges presents a potential security point of failure in that, if the namespace server is compromised, the host machines with which it operates may also be compromised. The present invention is directed, in part, to alleviating this potential security point of failure.

SUMMARY OF THE INVENTION

The disadvantages of the prior art are overcome by providing a system and method for administering security in a logical namespace of a storage system environment. A remote agent of an integrated management framework is installed on a host machine of a first domain in the storage system environment and is configured to operate with at least a subset of privileges assigned to an administrator of the machine and/or of that domain. A namespace and storage management (NSM) server resides in a second domain and cooperates with the remote agent to dynamically establish a trust relationship with the host machine of the first domain, thereby enabling remote agent-based namespace and storage management across multiple domains of the storage system environment.

According to an aspect of the invention, the remote agent performs an integral security-related role within the management framework that is directed to off-loading administration of privileges from the NSM server for namespace and storage management. Offloading of such privilege administration allows the integrated management framework to remotely establish the trust relationship between the NSM server and host machine, thereby obviating the need for a pre-configured (i.e., static) trust relationship across the domains. Advantageously, this aspect of the invention obviates the need for the NSM server to centrally administer privileges for host machines in any of the domains on which the remote agents reside and, thus, eliminates a potential security point of failure.

Another aspect of the present invention is directed to the ability to define and assign rights to a user of the NSM server in accordance with a security administration feature of the integrated management framework. According to this aspect of the invention, NSM server rights include (i) a namespace management right that enables the user to perform namespace management operations, (ii) a data migration right that enables the user to perform data migration from one share to another share, and (iii) a data protection right that enables the user to configure a data protection failover policy. In addition, a multi-stage authentication procedure is provided to ensure that a user has the appropriate rights to perform operations on the NSM server.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

A. Storage System Environment

Figure 1:
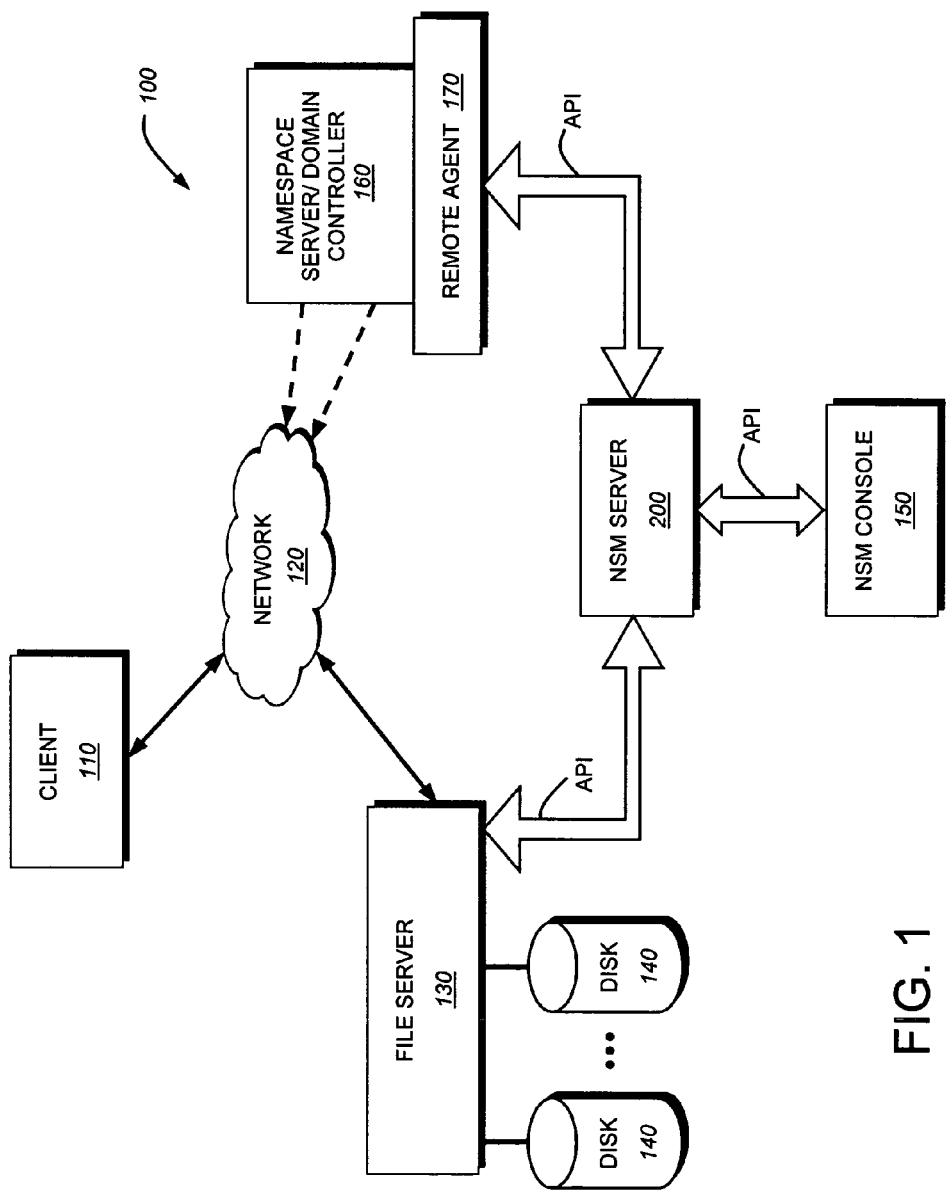
FIG. 1 is a schematic block diagram of an exemplary storage system environment that may be advantageously used with the present invention.

FIG. 1 is a schematic block diagram of an exemplary storage system environment 100 that may be advantageously used with the present invention. The storage system environment comprises a plurality of storage systems configured to provide storage services relating to information stored on storage devices, such as disks 140. The storage systems include file servers 130 executing operating systems such as, e.g., the Microsoft® Windows™ operating system (hereinafter "Windows operating system"), the Unix® operating system and the NetApp® Data ONTAP™ operating system available from Network Appliance, Inc., Sunnyvale, Calif. One or more clients 110 may connect to the file servers over a computer network 120, such as a point-to-point link, shared local area network, wide area network, or virtual private network implemented over a public network, such as the Internet.

Each client 110 may comprise an application executing on an operating system of a general-purpose computer that interacts with the file servers 130 in accordance with a client/server model of information delivery. That is, the client may request the services of a server, and the server may return the results of the services requested by the client, by exchanging packets over the network 120. The client may issue packets including storage (e.g., file-based) access protocols, such as the Common Internet File System (CIFS) protocol or Network File System (NFS) protocol, over the Transmission Control Protocol/Internet Protocol (TCP/IP) when accessing information in the form of, e.g., files and directories.

To facilitate client access to the information stored on the server, a file server 130 executing, e.g., the Windows operating system typically exports units of storage, e.g., (CIFS) shares. A client 110 may access information of the share by mounting the share and issuing a CIFS protocol access request that specifies a uniform naming convention (UNC) path to the share. Although the illustrative embodiment is directed to a Windows file server that is accessed using the CIFS protocol, the invention described herein is not so limited and may also apply to other servers 130, such as Unix filer servers and NetApp filers, that are accessible using other file access protocols, such as the NFS protocol. The client connects to file server 130 when accessing the share, typically by specifying the IP address (or identity) of the file server.

However, instead of requiring that the client know the specific identity of the server in order to access the share, a namespace server 160, such as the conventional Distributed File System (DFS) server, provides a namespace service that removes the specificity of server identity. Using the DFS service, a unique pathname (in the form of a UNC pathname) is created for the share such that the DFS server translates to an actual location of the share in the network. Moreover, in a typical Windows environment wherein a group of machines is organized as a domain, a domain controller, such as a primary domain controller (PDC), provides security (e.g., rights, privileges and authentication) services for the machines. Note that the PDC and DFS server may reside on separate machines or, as in the illustrative embodiment described herein, may reside on the same machine as separate services.

For example, assume a client application issues a CIFS request to access information of a share stored on a file server 130 in the environment 100. The request is passed through various layers of the client's operating system including, e.g., a CIFS redirector. Before issuing a CIFS packet directed to a UNC pathname specified by the client application, the redirector contacts a DFS server to determine whether there is a different, actual pathname needed to access the information. At that time, the DFS server performs a PDC lookup operation to determine whether the client has the appropriate privileges to access the data. If so, the actual pathname is provided to the redirector, which then uses that pathname to create the CIFS packet for transmission over the network to the appropriate file server. The DFS namespace service thus provides a level of indirection to a share that resides on a file server 130 in the environment 100. Upon receiving the packet, the file server verifies that the client has the appropriate privileges to access the information.

Although the illustrative embodiment is directed to a DFS namespace service provided by the Windows operating system executing on a DFS server, the invention described herein is not limited and may also apply to other namespace services, such as the NFS namespace provided by the Unix operating system executing on a conventional Name Information Service (NIS) server. Each service constructs a namespace to facilitate management of information using a layer of indirection between a file server 130 and client 110 accessing a shared storage resource (share) on the server. However, these namespace services are created on heterogeneous server platforms, which lead to incompatibility and non-interoperability with respect to management of different namespaces by, e.g., an administrator (user).

In the illustrative embodiment, a namespace and storage management (NSM) server 200 is provided that integrates namespace management and storage management in storage system environment 100. The NSM server 200 includes an integrated management framework that provides an underlying infrastructure that supports various heterogeneous storage access protocols within a single, logical namespace service. To that end, the NSM server cooperates with a NSM console 150 and a remote agent 170 to create the integrated management framework. As described herein, the integrated management framework, in turn, allows the NSM server 200 to interact with any namespace server, such as a DFS server configured to handle CIFS protocol requests or a NIS server configured to handle NFS protocol requests, directed to namespace services.

Figure 2:
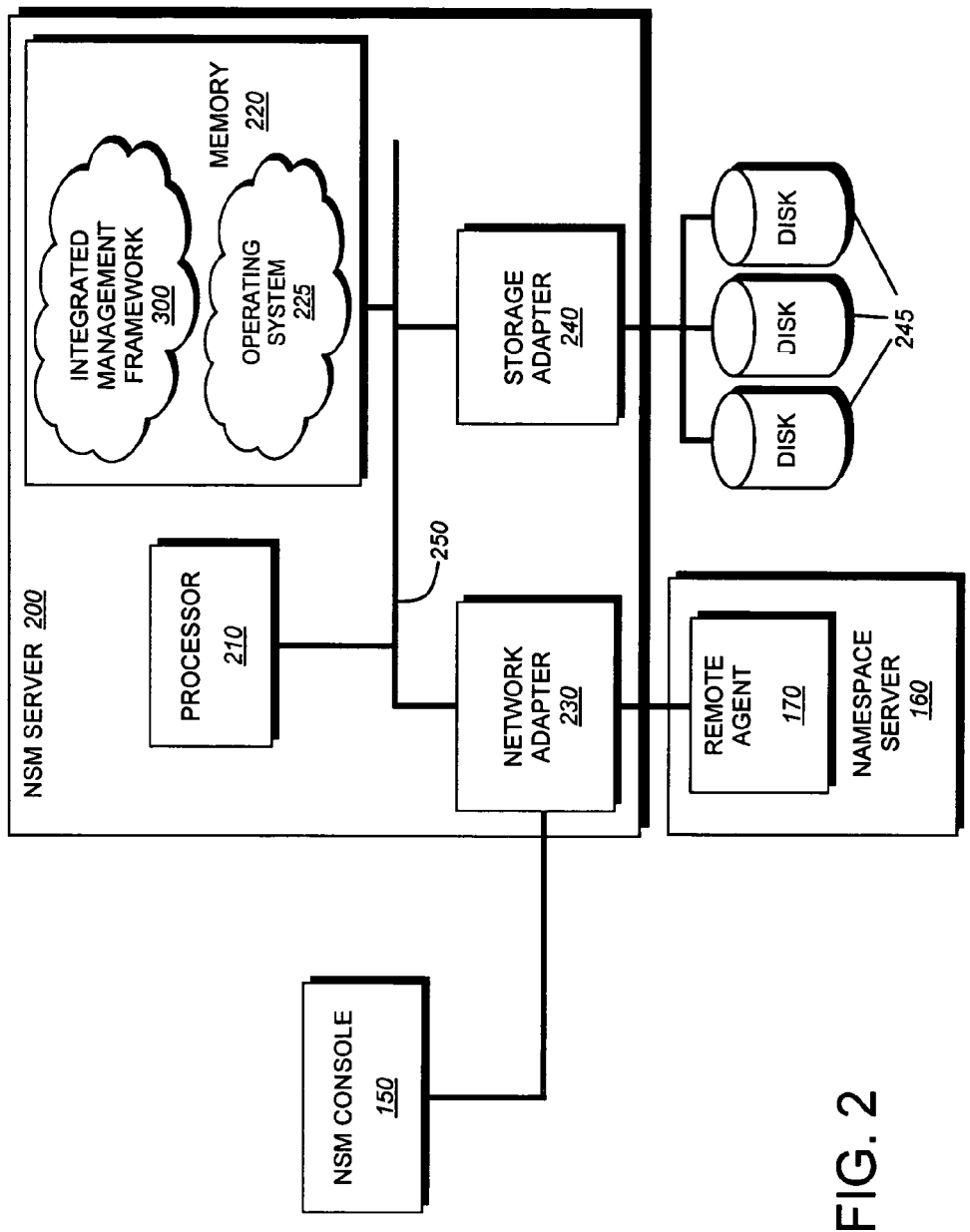
FIG. 2 is a schematic block diagram of an exemplary namespace and storage management server that may be advantageously used with the present invention.

FIG. 2 is a schematic block diagram of an exemplary namespace and storage management (NSM) server 200 that may be advantageously used with the present invention. The NSM server illustratively comprises a processor 210, a memory 220, a network adapter 230 and a storage adapter 240 interconnected by a system bus 250. The memory 220 may comprise storage locations addressable by the processor and adapters for storing software programs, i.e., specific sets of ordered operations, and data structures associated with the invention. The processor and adapters may, in turn, comprise processing elements and/or logic circuitry configured to execute the programs and manipulate the data structures. In particular, the storage adapter 240 comprises the mechanical, electrical and signaling circuitry needed to connect the server to storage devices, such as disks 245. Similarly, the network adapter 230 comprises the mechanical, electrical and signaling circuitry needed to connect the server 200 to, e.g., the NSM console 150 and remote agent 170.

An operating system 225, portions of which is typically resident in memory 220 and executed by the processing elements, functionally organizes the server by, inter alia, invoking operations in support of storage services implemented by the server. In the illustrative embodiment, the operating system is preferably the Windows operating system, although it is expressly contemplated that any appropriate operating system, such as the Unix operating system, may be enhanced for use in accordance with the inventive principles described herein. The operations invoked by the operating system are illustratively namespace and storage operations in support of an integrated management framework 300 provided by the server. It will be apparent to those skilled in the art that other processor and memory means, including various computer readable media, may be used for storing and executing program instructions pertaining to the invention described herein.

B. Integrated Management Framework

Figure 3:
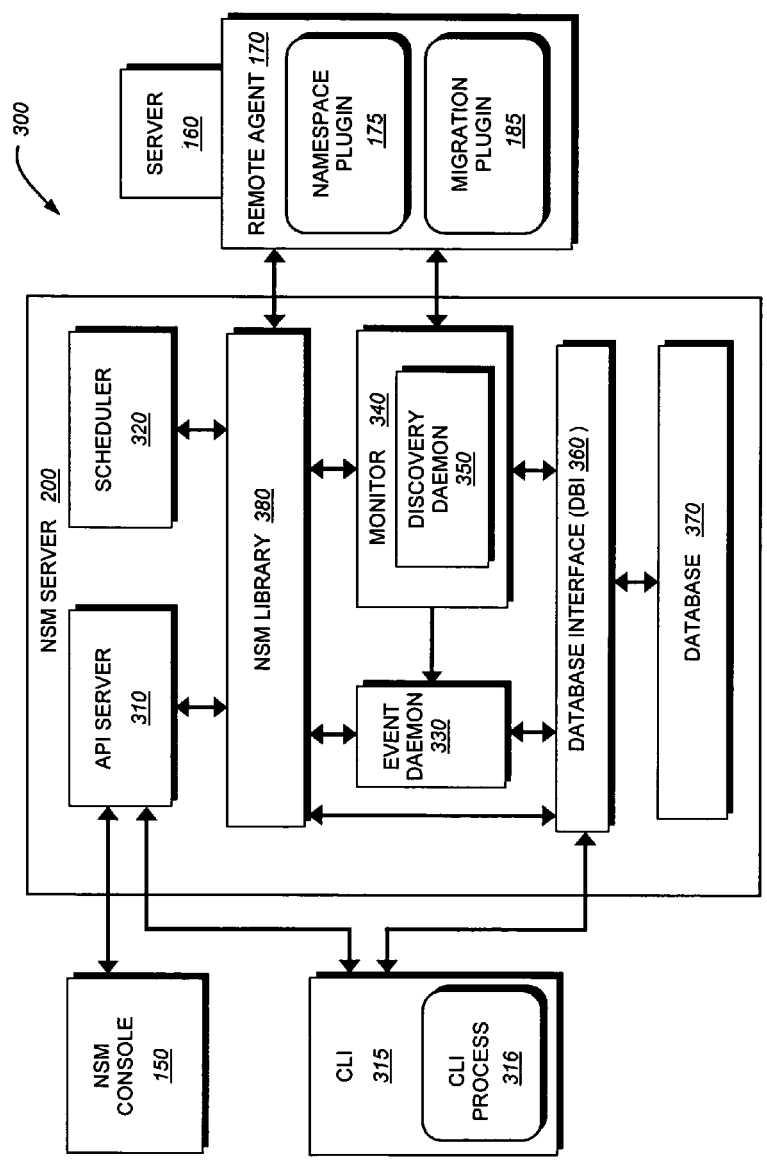
FIG. 3 is a schematic block diagram of an integrated management framework in accordance with the present invention.

The NSM server 200 generally provides its storage services through the execution of software modules, such as processes. These services are illustratively implemented as separately-scheduled processes (and/or daemons) that execute in user space of operating system 225 to provide the integrated management framework 300. As used herein, a process refers to an instance of a program being executed by, e.g., the processor and a thread is an instance of a sequence of the process's program code. FIG. 3 is a schematic block diagram of the integrated management framework 300 in accordance with the present invention. The integrated management framework 300 provides a logical namespace service that is based on extensions to underlying storage management technology and other technological components. Notably, these extensions are embodied as library functionality.

In the illustrative embodiment, the underlying storage management technology is embodied as DataFabric® Manager (DFM) technology available from Network Appliance, Inc., Sunnyvale, Calif. and described in DataFabric® Manager 3.2 Administration Guide, 1994-2004, which is hereby incorporated by reference. Broadly stated, the DFM technology comprises a set of coordinating processes, including an application programming interface (API) server 310, a scheduler 320, an Event daemon 330, a Monitor 340 including a Discovery daemon 350 and a database interface (DBI) 360 configured to interact with an embedded database 370. The present invention extends the capabilities of these processes to create the integrated namespace and storage management framework 300 through the addition of NSM library functionality 380. As described herein, the NSM library 380 is illustratively implemented as various library modules, each of which provides namespace and storage management actions embodied as APIs.

The integrated management framework 300 exposes a set of interfaces, e.g., an API interface that is used by the NSM console 150 and a command line interface (CLI 315), used by a communication protocol. Illustratively, the communication protocol is embodied as an XML over HTTP mechanism for APIs, primarily because of its ability to describe data conveyed over the network, as well as the transport, without describing the actual storage access protocol. An example of a communication protocol that may be advantageously used with the present invention is the ZAPI protocol available from Network Appliance, Inc. Such a protocol is also easily extensible and flexibly agnostic to binary formats of specific servers and clients to thereby operate efficiently in a heterogenous environment.

In the illustrative embodiment, the integrated management framework 300 facilitates configuration and management of pathnames in the logical namespace. That is, the underlying infrastructure of the framework allows a user to manage various pathnames exported by heterogeneous namespace service and protocol implementations within the logical namespace. This aspect of the framework involves creation of a layer of abstraction that presents to a client a notion of the logical namespace that is accessible via a particular storage access protocol. As noted, the various heterogeneous namespace services are not interoperable with respect to user management; the integrated framework 300, as described further herein, extracts logical "views" (e.g., pathnames) from the namespaces exported by the heterogeneous services, stores those pathnames in database 370, and then configures the pathnames so that they are accessible in the logical namespace via the storage access protocol.

In storage and networking environments, some operations can only be executed if a user (such as a system administrator) is logged into a server on which the operations are to be performed, e.g., the NSM server. In other words, a remote operation that is to be invoked on the server 200 can only be performed if the user is logged into the server. The NSM console 150 and remote agent 170 of the integrated management framework 300 address this problem. Illustratively, the NSM console 150 is a component of the framework that includes a JAVA-based interface and the remote agent 170 is a software module installed on a host machine, such as a server 160, which manages a particular namespace, e.g., a DFS server. Using the communication protocol, the NSM console issues APIs to the NSM server which, in turn, issues APIs that are invoked on the remote agent to perform actions requested by the user.

Essentially, the remote agent 170 is a thin web server that includes "programmatic glue" to enable installation of plug-in modules ("plug-ins") that provide certain functionality of the remote agent. To that end, the plug-in module is embodied as software code that operates within the context of the remote agent process and provides an interface to the host platform. In the illustrative embodiment described herein, plug-in modules include a namespace plug-in 175 that allows remote access and management of data (e.g., pathnames) by the NSM server 200 and a migration plug-in 185 that provides a migration capability of the remote agent 170.

For example, the namespace plug-in 175 is installed on a remote agent 170 of a host machine, such as server 160, that manages a particular namespace; in accordance with the integrated management framework 300, the plug-in has the intelligence to communicate with the server to manage the logical namespace by, e.g., creating the namespace, creating and/or deleting link points of the namespace, etc. The novel plug-in module provides an interface from the integrated management framework architecture to the architecture of its host machine. To that end, the remote agent may comprise an API server that cooperates with an API service on Windows platforms (or a daemon process on Unix platforms) to receive API requests from the NSM server and translate them into host machine calls, such as Win32 APIs or Unix system calls.

Illustratively, the remote agent 170 is installed on a machine that hosts a DFS server of a Windows/DFS environment. The namespace management plug-in module 175 may, in turn, be installed on the remote agent to enable communication with the NSM server 200 when accessing namespace information stored on the DFS server. Specifically, the NSM server issues APIs in connection with the communication protocol to instruct the remote agent 170 to perform certain actions. For example, in order to construct or change pathnames in the uniform namespace, a user interacts with the NSM console 150 to access that namespace by, in effect, invoking a set of APIs on the NSM server 200 which, in turn, invokes a set of APIs on the remote agent 170. Once the NSM server has cooperated with the DFS server to construct the pathnames, those servers are no longer involved in client data accesses.

Although the illustrative embodiment describes installation of the remote agent on a server 160 that hosts a DFS service of a Windows environment, it should be noted that the remote agent could also be used to monitor other server platforms, such as NFS/NIS systems. That is, the novel remote agent functionality and security architecture facilitates portability to multiple operating system platforms or hosts, such as Windows, Unix, and Solaris, so that the integrated management framework 300 can manage namespace and storage objects of those hosts. The remote agent is illustratively constructed without the use of operating system specific code, and is adapted to operate on various operating system platforms through the use of operating system calls and APIs specific to each platform. For example, a remote agent that resides on a Windows host machine uses Windows operating systems calls and APIs (e.g., Win32 APIs) to communicate with the host machine.

It should be noted that the underlying directory data structures used in the logical namespace of the present invention reside on the namespace server 160 providing the particular namespace service, such as a DFS server. That is, the namespace server 160 implements the basic namespace; the NSM server 200 provides a service for configuring that namespace. To that end, the NSM server 200 cooperates with the remote agent 170 to acquire a copy of the namespace directory structures from the namespace server 160 and stores the copy on the embedded database 370. The NSM server then cooperates with the NSM console 150 to allow a user to manipulate (configure) the copy. Once configuration is complete, the server 200 cooperates with the remote agent to "push" (store) the manipulated copy of directory structures back to the namespace server 160.

The Monitor 340 is illustratively embodied as a multi-threaded process having a collection of individual monitor threads, each of which is scheduled by the scheduler 320. The Monitor 340 cooperates with the remote agent 170 to communicate with one or more machines/devices in the storage system environment 100 (using SNMP, RSH, etc) to collect any type of storage or data/namespace object information (e.g., volume and/or qtree information, as well as information about namespace servers) available in the environment and, to that end, functions as a data collector. Illustratively, each monitor thread is configured to collect information about a particular object in the environment. Extensions to the Monitor are directed to namespace and agent management, each of which is illustratively embodied as an individual monitor thread.

As data is collected, the Monitor 340 determines whether it needs to notify any processes of some resulting condition. For example, an individual monitor thread may detect a threshold and the occurrence of some type of event. As used herein, an event is a synchronous notification with a severity attribute. By configuring thresholds, the NSM server 200 can determine when an event occurs. An example of a threshold is "if volume capacity is greater than 50%, generate an event, out-of-space". If a threshold is exceeded, the Monitor 340 communicates with the Event daemon 330 to notify it of that event. Thus, the Monitor 340 is configured to detect certain events and, in response, generate is event notifications to the Event daemon 330. The Event daemon 330 then determines what (if any) further action is needed (e.g., send an SMTP alert, an email, an SNMP trap) and records the event in the embedded database 370.

The embedded database 370 is illustratively implemented as a Sybase relational database that exports a set of Simple Query Language (SQL) function calls that enable storage/retrieval of data, such as namespace objects, to/from the database. A schema of the database is configured to efficiently capture characteristics of a namespace independent of the storage access protocol, such as NFS or CIFS. The database 370 is illustratively organized as a plurality of tables, each of which can be accessed by processes within the NSM server. The DBI 360 is illustratively embodied as a SQL interface to the database and its associated tables, although it will be understood to those skilled in the art that the DBI may be embodied as any other type of database protocol interface depending on the actual implementation of the database, e.g., an Oracle database.

The API server 310 is illustratively embodied as a multi-threaded process that is configured to implement the APIs used by the NSM console 150 to access the database 370 and manipulate information stored thereon. The API server 310 also implements the communication protocol APIs used to interact with the remote agent 170. Accordingly, extensions to the API server 310 are primarily directed to those APIs required to manipulate the database and the remote agent. For example, APIs are invoked by a user (via the NSM console 150) to manipulate (modify, update) the embedded database 370. The API server 310 updates the database with respect to user configuration requests and the Monitor 340 periodically queries (polls) the database for any state/information change. Depending upon the change, the API server may cooperate with the Monitor to instruct data collection from the remote agent 170. After receiving the collected information from the remote agent, the Monitor 340 updates the database and the Event daemon 330.

C. Remote Agent Based Namespace and Storage Management

The present invention relates to a system and method for administering security in a logical namespace of a storage system environment. A remote agent of the integrated management framework is installed on a host machine of a first domain in the storage system environment and is configured to operate with at least a subset of privileges assigned to an administrator of the machine and/or of that domain. The NSM server resides in a second domain and cooperates with the remote agent to dynamically, i.e., in real time, establish a trust relationship with the host machine of the first domain, thereby enabling remote agent-based namespace and storage management across multiple domains of the storage system environment. As described herein, remote agent-based management provides a number of advantageous capabilities, including improved security by limiting the risk and damage associated with compromising of the NSM server, as well as the flexibility to interface the NSM server to multiple host operating system platforms.

According to an aspect of the invention, the remote agent 170 performs an integral security-related role within the management framework 300 that is directed to off-loading administration of privileges (including access rights) from the NSM server 200 for namespace and storage (e.g., migration) management. Offloading of such privilege administration allows the integrated management framework to remotely establish the trust relationship between the NSM server and host machine (e.g., server 160), thereby obviating the need for a pre-configured (i.e., static) trust relationship across the domains (e.g., to enable management of a particular namespace). Advantageously, this aspect of the invention obviates the need for the NSM server to centrally administer privileges for host machines in any of the domains on which the remote agents reside and, thus, eliminates a potential security point of failure. In other words, if the NSM server 200 is compromised (or breached), the breach will not affect the other host machines accessible via the logical namespace.

When managing a particular namespace (e.g., DFS), the NSM server 200 does not communicate directly with the host machine (e.g., server 160), but rather communicates to with the remote agent 170 that is resident on (and running local to) that server. As such, the NSM server does not issue any host-based (e.g., Windows) system calls and, thus, does not require a tightly-coupled arrangement and corresponding direct communication with the operating system of the host machine in order to establish the trust relationship. Instead, the NSM server 200 delegates the responsibility of those system calls to the remote agent 170 through API messages of the communication protocol; according to the invention, transfer of these API messages to the remote agent remotely (and dynamically) establishes the trust relationship. The remote agent then issues appropriate system calls into the operating system of the host machine. The agent is thus used as a common infrastructure to perform operations, including storage resource management operations, on machines that are loosely-coupled to the NSM server 200.

Notably, the remote agent 170 is configured to operate with at least a subset of the privileges (including access rights to network resources) assigned an administrator of the server 160 on which it is installed and/or of the domain in which the server is located. In other words, if the server 160 in a Windows domain has administrative privileges to access other machines in the same or other domains, than the remote agent may also have such privileges. The assignment of such privileges is necessary because the remote agent illustratively becomes part of the software running on the server (host machine) on which it is installed. Therefore, a requirement of the integrated management framework 300 is that the remote agent be configured to operate under the privileges of the administrator of a host machine/server (e.g., a domain controller) in a particular domain. In this case, the remote agent may have access to all machines in the domain so that it can perform, e.g., share creation, deletion, etc. Moreover since it resides on the domain controller for the domain, the remote agent has the appropriate privileges to perform namespace operations on a namespace server.

Unlike previous systems, the NSM server 200 does not require sufficient privileges to each host machine with which it operates and, thus, does not have to centrally administer those privileges. By distributing the administration of privileges to each remote agent 170 residing on a host machine, the integrated management framework 300 off-loads the processing and management needed to administer those privileges from a centralized server. Distribution of such administration is also desirable (and thus advantageous) because it is generally "cleaner" to grant privileges to software running locally on a host machine rather than granting such privileges to software running externally to (outside of) the machine. Furthermore, since the security/privilege attributes (along with other platform specific requirements) are encapsulated into the remote agents 170 and not the NSM server 200, this aspect of the invention advantageously enables operation of the integrated management framework within a heterogeneous environment having different namespace server platforms.

Figure 4:
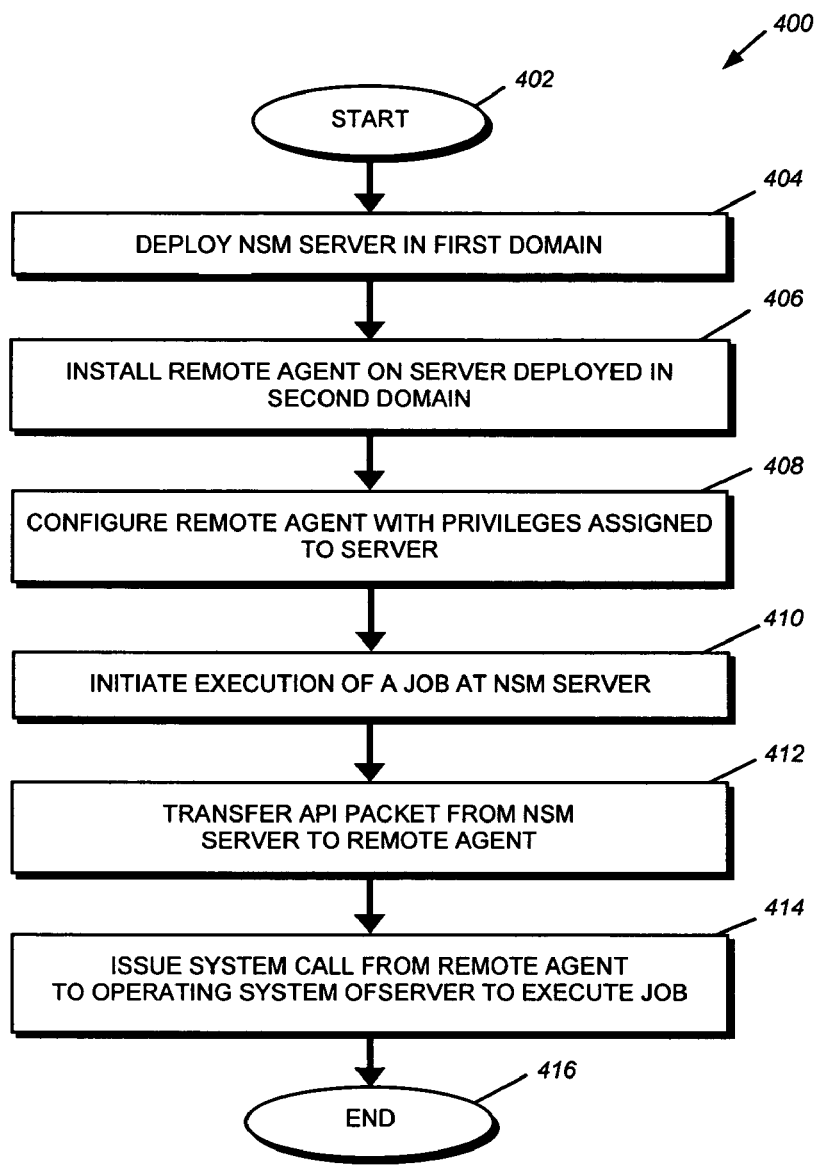
FIG. 4 is a flowchart illustrating a procedure for administering security in a logical namespace of the storage system environment according to the present invention.

FIG. 4 is a flowchart illustrating a procedure for administering security in a logical namespace of a storage system environment according to the present invention. The procedure 400 starts at Step 402 and proceeds to Step 404 where the NSM server 200 is deployed (resident) in a first domain. In Step 406, the remote agent 170 is installed on a host machine, such as a server 160, deployed in a second domain. In Step 408, the remote agent is configured with the privileges (including access rights to network resources) assigned to the server 160. Assume that the privileges assigned to the server enable administrative access to all host machines/servers in the second domain and a system administrator (user account) under which the NSM server operates does not include such administrative access in the second domain.

In Step 410, the NSM server initiates execution of a job relating to, e.g., namespace auto-population, using the remote agent. An example of such job execution is described in previously incorporated U.S. patent application Ser. No. 11/384,711. Broadly stated, the NSM server invokes one or more APIs within one or more packets and, in Step 412, transfers the API packet to the remote agent. The API packet includes a function call instructing the agent to execute the namespace job by, e.g., generating appropriate APIs to instruct the remote agent to discover shares that are accessible in the network. Since the remote agent has the same, or at least a subset of, administrative privileges in the domain as the server on which it is installed, the remote agent, in Step 414, issues one or more system calls to the operating system of the host machine (e.g., server 160) to execute the job and discover the shares by, inter alia, retrieving appropriate data (files) from the (e.g., PDC) server 160 and copying them to the NSM server 200. The procedure then ends at Step 416.

It should be noted that there may be restrictions as to the specific operations that the NSM server can perform with respect to namespace and storage management in a domain. For example, the NSM server may only be able to issue (and process) certain namespace and storage management operations, such as namespace creation, share discovery and share creation. Thus, the NSM server may instruct the remote agent (via APIs) to manage the namespace on the server 160 in the second domain by, among other things, discovering shares because the remote agent has the appropriate privileges. However, the NSM server may not issue other operations independent of namespace and storage management to the remote agent, such as independent operations to remove/delete files on the server. This feature of the invention provides another security safeguard by restricting the operations that the NSM server and remote agent can execute in a domain. Thus, if the NSM server is compromised, there is only the restricted set of operations that the remote agent can perform.

D. NSM Server Rights

Another aspect of the present invention is directed to the ability to define and assign rights to a user of the NSM server 200 in accordance with a security administration feature of the integrated management framework 300. Broadly stated, the NSM server has its own way of managing security using rights wherein, according to the integrated management framework, a right denotes the ability of a user (system administrator) to execute features of the NSM server. That is, depending upon the type of features that the NSM server provides/exports, the NSM server rights allow a user to perform operations on the NSM server. Note that without the right, the user cannot perform the specific operations.

According to this aspect of the invention, NSM server rights include (i) a namespace management right that enables the user to perform namespace management operations, such as create namespaces, create links, etc. (ii) a data migration right that enables the user to perform data migration from one share to another share, and (iii) a data protection right that enables the user to configure a data protection failover policy. In addition, a multi-stage authentication procedure is provided to ensure that a user has the appropriate rights to perform operations on the NSM server.

In the illustrative embodiment, a system administrator ("primary user") installs the NSM server and, by default, has all NSM server rights. Other secondary or sub-administrators are granted some or all of the above rights by the primary user. Notably, previous namespace servers generally do not have a concept of such distinct rights (i.e., a user has all or no rights for its server). For example, assume a primary user wants to perform a namespace operation using the NSM server. The user must first have a namespace right to perform the operation and, if so, the user can invoke the namespace operation on the server, which causes the NSM server to issue the namespace operation to the appropriate remote agent for execution. Note that the remote agent has no concept of the NSM server rights; it is only concerned with obtaining the appropriate host machine privileges to execute the NSM-specific operations on the host. That is, assume further that the namespace operation is directed to creation of a share. In order to create the share, the remote agent must have the appropriate privileges (access rights and/or domain name password) on its host machine.

Indications of the NSM server rights that are extended to a primary user (administrator) and one or more sub-administrators are stored in the embedded database 370. A multi-stage authentication procedure is provided to ensure that the administrator (and/or sub-administrator) has the appropriate rights to perform operations on the NSM server. In the illustrative embodiment, a CLI process 316 (of CLI 315) and API server 310, among other processes, of the integrated management framework 300 cooperate to implement the novel multi-stage authentication procedure.

Figure 5:
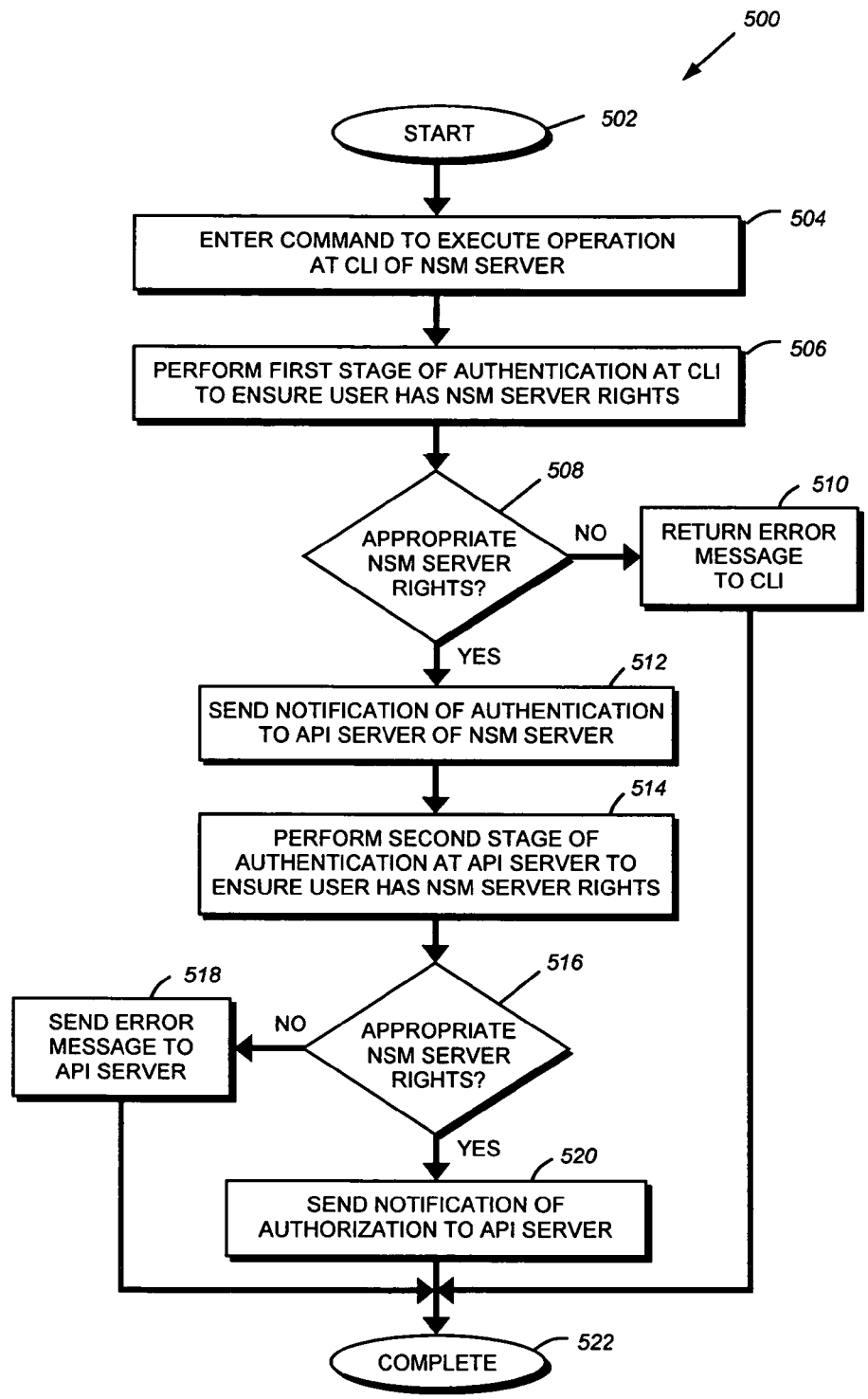
FIG. 5 is a flowchart illustrating a multi-stage authentication procedure according to the present invention.

FIG. 5 is a flowchart illustrating the multi-stage authentication procedure according to the present invention. The procedure 500 starts at Step 502 and proceeds to Step 504 where an administrator (user) interacts with the CLI process 316 of the NSM server 200 to enter a command (operation) for execution by the server. Note that the CLI process illustratively runs under the user's (security) account to receive the operation. The CLI process then cooperates with the operating system 225 to determine (i) the identity (ID) of the currently logged in user and (ii) whether the user has rights on the NSM server to perform the attempted operation. Specifically, the CLI process 316 issues an operating system call to access the DBI 360 and, in Step 506, performs a first stage of authentication comprising a first look-up operation into the database 370 using, e.g., the user ID. Note that there is illustratively a separate table of the database 370 configured to store an indication of the NSM server rights assigned to each user. In Step 508, a determination is made as to whether the user has the appropriate NSM server rights to perform the operation. If not, an error message is returned to the CLI 315 in Step 510, indicating that the user does not have the requisite rights to perform the operation. The procedure zo then ends at Step 522.

However, if it is determined that the user has the appropriate rights, the DBI 360 sends a notification of authorization to the API server 310 in Step 512. In Step 514, the API server 310 performs a second stage of authentication comprising a second look-up operation into the database 370. The second level of authentication is needed because the NSM console 150, which communicates directly with the API server 310, can be "launched" (instantiated) from any machine, including a machine that is remote from the NSM server, whereas the CLI is closely-coupled to (e.g., residing on) the NSM server. Thus, the second stage of authentication ensures that an NSM console user cannot bypass rights checking. In Step 516, a determination is made as to whether the user has the appropriate NSM server rights to perform the operation. If not, the DBI 360 sends an error message to the API server indicating insufficient user rights in Step 518 and the procedure ends at Step 522. Otherwise, the DBI sends a notification of authorization to the API server 310 in Step 520 and the procedure ends at Step 522.

In sum, a system and method is provided for administering security in a logical namespace of a storage system environment. In one aspect of the invention, the remote agent performs an integral security-related role within the management framework that is directed to off-loading administration of privileges from the NSM server for namespace and storage management. In another aspect, NSM server rights are defined and assigned to users of the NSM server in accordance with a security administration feature of the integrated management framework. In yet another aspect of the invention, a multi-stage authentication procedure is provided to ensure that a user has the appropriate rights to perform operations on the NSM server.

The foregoing description has been directed to specific embodiments of this invention. It will be apparent, however, that other variations and modifications may be is made to the described embodiments, with the attainment of some or all of their advantages. For instance, it is expressly contemplated that the procedures, processes and/or modules described herein may be implemented in hardware, software, embodied as a computer-readable medium having program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to administer security in a logical namespace of a storage system environment, the system comprising:

a remote agent of an integrated management framework, the remote agent installed on a host machine of a first domain in the storage system environment; and a namespace and storage management (NSM) server, comprising a processor and a memory, residing in a second domain and cooperating with the remote agent to dynamically establish a trust relationship with the host machine of the first domain by transferring at least one application program interface (API) message from the NSM server to the remote agent to delegate responsibility of issuing system calls associated with namespace and storage management to the remote agent, thereby enabling remote agent-based namespace and storage management, through the NSM server, across multiple domains of the storage system environment, wherein rights are assigned to a user of the host machine interacting with the NSM server in accordance with a security administration feature of the integrated management framework and wherein an authentication procedure is provided, utilizing a database of the NSM server, that indicates the rights assigned to the user to ensure that the user has appropriate rights to perform operations on the NSM server.

2. The system of claim 1 wherein the remote agent is configured to operate with at least a subset of privileges assigned to one of an administrator of the host machine and that of the first domain.

3. The system of claim 2 wherein the remote agent offloads administration of the privileges from the NSM server to remotely establish the trust relationship between the NSM server and the host machine, thereby obviating a need for a pre-configured trust relationship across the domains.

4. A method for administering security in a logical namespace of a storage system environment, the method comprising:

installing a remote agent of an integrated management framework on a host machine of a first domain in the storage system environment;

deploying a namespace and storage management (NSM) server, comprising a processor and a memory, in a second domain of the environment;

dynamically establishing a trust relationship between the host machine of the first domain and the NSM server in the second domain by transferring at least one application program interface (API) message from the NSM server to the remote agent to delegate responsibility of issuing system calls associated with namespace and storage management to the remote agent, to thereby enable remote agent-based namespace and storage management, through the NSM server, across multiple domains of the storage system environment;

assigning rights to a user of the NSM server in accordance with a security administration feature of the integrated management framework; and providing an authentication procedure, utilizing a database of the NSM server, that indicates the rights assigned to the user to ensure that the user has appropriate rights to perform operations on the NSM server.

5. The method of claim 4 further comprising:
configuring the remote agent to operate with at least a subset of privileges assigned to one of an administrator of the host machine and that of the first domain.

6. The method of claim 5 further comprising:
offloading administration of the privileges from the NSM server to the remote agent to remotely establish the trust relationship between the NSM server and the host machine and thereby obviate a need for a pre-configured trust relationship across the domains.

7. The method of claim 4 wherein the rights include one or more of a namespace management right that enables the user to perform namespace management operations, a data migration right that enables the user to perform data migration from one share to another share, and a data protection right that enables the user to configure a data protection failover policy.

8. The method of claim 4 wherein the authentication prodecure is
a multi-stage authentication procedure to ensure that the user has the appropriate rights to perform the operations on the NSM server.

9. The method of claim 8 wherein providing further comprises:
performing a first look-up operation into the database of the NSM server by a command line interface process of the NSM server in accordance with a first stage of authentication, the database configured to store an indication of the rights assigned to the user.

10. The method of claim 9 wherein providing further comprises:
performing a second look-up operation into the database by an API server of the NSM server in accordance with a second stage of authentication.

11. A non-transitory computer readable medium containing executable program instructions executed by a processor, comprising:
program instructions that install a remote agent of an integrated management framework on a host machine of a first domain in the storage system environment;
program instructions that deploy a namespace and storage management (NSM) server, comprising a processor and a memory, in a second domain of the environment;
program instructions that dynamically establish a trust relationship between the host machine of the first domain and the NMS server in the second domain by transferring at least one application program interface (API) message from the NSM server to the remote agent to delegate responsibility of issuing system calls associated with namespace and storage management to the remote agent, to thereby enable remote agent-based namespace and storage management, through the NSM server, across multiple domains of the storage system environment;
program instructions that assign rights to a user of the NSM server in accordance with a security administration feature of the integrated management framework; and
program instructions that provide an authentication procedure, utilizing a database of the NSM server configured to store an indication of the rights assigned to the user, to ensure that the user has the rights to perform operations on the NSM server.

12. The non-transitory computer readable medium of claim 11 further comprising:
program instructions that configure the remote agent to operate with at least a subset of privileges assigned to one of an administrator of the host machine and that of the first domain.

13. The non-transitory computer readable medium of claim 12 further comprising:
program instructions that offload administration of the privileges from the NSM server to the remote agent to remotely establish the trust relationship between the NSM server and the host machine and thereby obviate a need for a pre-configured trust relationship across the domains.

14. The non-transitory computer readable medium of claim 11 wherein program instructions that assign further comprise:
program instructions that assign rights to the user of the NSM server in accordance with a security administration feature of the integrated management framework.

15. The non-transitory computer readable medium of claim 14 further comprising:
program instructions that provide a multi-stage authentication procedure to ensure that the user has appropriate rights to perform operations on the NSM server.

16. A method for administering security in a logical namespace of a storage system environment, the method comprising:
installing a remote agent of an integrated management framework on a host machine of a first domain in the storage system environment;
deploying a namespace and storage management (NSM) server, comprising a processor and a memory, in a second domain of the environment;
dynamically establishing a trust relationship between the host machine of the first domain and the NSM server in the second domain by transferring at least one application program interface (API) message from the NSM server to the remote agent to delegate responsibility of issuing system calls associated with namespace and storage management to the remote agent, to thereby enable remote agent-based namespace and storage management, through the NSM server, across multiple domains of the storage system environment;
assigning rights to a user of the NSM server in accordance with a security is administration feature of the integrated management framework;
providing a multi-stage authentication procedure to ensure that the user has appropriate rights to perform operations on the NSM server; and
performing a first look-up operation into a database of the NSM server by a command line interface process of the NSM server in accordance with a first stage of authentication, the database configured to store an indication of the rights assigned to the user.

\* \* \* \* \*

UNITED STATES PATENT AND TRADEMARK OFFICE
CERTIFICATE OF CORRECTION

PATENT NO. : 8,151,360 B1
APPLICATION NO. : 11/384795
DATED : April 3, 2012
INVENTOR(S) : K. Uday Kishore It is certified that error appears in the above-identified patent and that said Letters Patent is hereby corrected as shown below:

Col. 1, line 35 should read: "storage area network and a disk assembly directly ~~attacked~~attached to"

Col. 2, line 58 should read: "known and described in ~~VFW~~VFM™ (Virtual File Manager) Ref-"

Col. 3, line 12 should read: "resources on different ~~is~~ machines in, e.g., a first domain, but"

Col. 7, line 31 should read: "ers and clients to thereby operate efficiently in a ~~heterogenous~~heterogeneous"

Col. 10, line 46 should read: "machine (e.g., server 160), but rather communicates ~~to~~ with"

Col. 13, line 27 should read: "perform the operation. The procedure ~~zo~~ then ends at Step"

Col. 13, line 63 should read: "that other variations and modifications may be ~~is~~ made to the"

Col. 15, lines 19-20 should read: "8. The method of claim 4 wherein the authentication ~~prodecure~~procedure is"

Signed and Sealed this
Twelfth Day of June, 2012

David J. Kappos
*Director of the United States Patent and Trademark Office*